United States Patent

Baker

Patent Number: 5,993,122
Date of Patent: Nov. 30, 1999

[54] MACHINE TOOL ATTACHMENT

[75] Inventor: Anthony T Baker, Hull, United Kingdom

[73] Assignee: British Aerospace Public Limited Company, Farnborough, United Kingdom

[21] Appl. No.: 09/119,527

[22] Filed: Jul. 21, 1998

Related U.S. Application Data

[63] Continuation of application No. PCT/GB97/03188, Nov. 20, 1997.

[30] Foreign Application Priority Data

Nov. 22, 1996 [GB] United Kingdom ............... 9624331

[51] Int. Cl.$^6$ ............................................. B23B 47/00
[52] U.S. Cl. ........................... 408/67; 408/97; 408/112; 409/137
[58] Field of Search ............................ 408/67, 95, 97, 408/112; 409/137

[56] References Cited

U.S. PATENT DOCUMENTS

| | | | |
|---|---|---|---|
| 5,033,917 | 7/1991 | McGlasson | 408/67 |
| 5,356,245 | 10/1994 | Hosoi et al. | 408/67 |

FOREIGN PATENT DOCUMENTS

| | | | |
|---|---|---|---|
| 000346231 | 12/1989 | European Pat. Off. | 408/95 |
| 0426321 | 5/1991 | European Pat. Off. | 408/67 |
| 1 334 366 | 10/1973 | United Kingdom . | |
| 2 078 934 | 1/1982 | United Kingdom . | |
| 2 096 030 | 10/1982 | United Kingdom . | |

*Primary Examiner*—Daniel W. Howell
*Assistant Examiner*—Monica L. Smith
*Attorney, Agent, or Firm*—Nixon & Vanderhye P.C.

[57] ABSTRACT

A drill or machine tool attachment for use with a vacuum debris extraction system, comprising a bar to which a vacuum extraction nozzle is attached, and a tube slidably mounted on the bar and connected to a drill or machine tool. The nozzle is located on the bar ahead of the drill or machine tool, with the tube biased toward an extended position by at least one spring. The limit of the extended position is set by a locking plate. In use, as the apparatus is offered up to a workpiece to perform a drilling or machining operation, the nozzle makes initial contact with the surface of the workpiece and as the operator applies pressure to the assembly, the drill or machine tool and associated bit or tool moves slideably against the action of the spring thereby guiding the bit or tool through an aperture in the nozzle to contact the workpiece.

4 Claims, 1 Drawing Sheet

MACHINE TOOL ATTACHMENT

This application is a continuation of PCT/EB97/03188 filed on Nov. 20, 1997.

BACKGROUND OF THE INVENTION

1. Field of the Invention

This invention relates to the field of machine tool attachments and more specifically, but not exclusively to such attachments for use with debris or swarf removal apparatus.

2. Discussion of Prior Out

In the fields of hand power tools there have been any number of attempts to try and minimize the problem of debris or swarf production by such methods as vacuum removal at the workface and/or small debris collectors placed in the vicinity of the drill bit or machine tool.

One such method of vacuum removal has been described in GB Patent Application Number 9600117.7 filed by the inventor, which comprises the use of a debris collection bowl having a first an aperture for the insertion of a drill bit or machine tool and a second aperture for connection to vacuum source. When in use, the collection bowl is offered up to a workpiece, a drill bit or machine tool inserted through the first aperture and the debris or swarf created is drawn away by the vacuum source to a collection point.

The problem associated with the use of such a system of debris or swarf removal lies in the requirement of the operator to use one hand for holding the vacuum attachment in place on the workpiece and his other hand for operating the drill or machine tool. This problem my become significant when an operator is required to perform numerous sequential drilling or machining operations, thus requiring the operator to repeatedly perform the action of re-positioning and holding the debris of swarf removal attachment followed by inserting and guiding the drill bit or machine tool. As will be appreciated, any increase in the number actual tasks required to be performed by an operator may lead to a reduction in the overall time to complete a set task. which, in times of increasing efficiency and reducing man-hours, may impose a significant financial burden on a manufacturer.

SUMMARY OF THE INVENTION

Our invention allows an operator to utilize debris or swarf removal apparatus such as that described but provides for such use without the requirement for having to separately position and hold the attachment thereby reducing the effort and indeed time taken to perform each drilling or machining operation and potentially the overall quality of the workpiece.

Accordingly there is provided a drill or machine tool attachment for use with a vacuum debris extraction system, comprising a spring loaded arm means to which a vacuum extraction nozzle means is attached, means for slideably connecting the spring loaded arm to a drill or machine tool, the nozzle means being located on the spring loaded arm ahead of the drill or machine tool, such that in use, as the apparatus is offered up to a workpiece to perform a drilling or machining operation, the nozzle means makes initial contact with the surface of the workpiece and as the operator applies pressure to the assembly, the drill or machine tool and associated bit or tool moves slideably against the action of the spring loaded arm thereby guiding the bit or tool through an aperture in the nozzle means to contact the workpiece.

BRIEF DESCRIPTION OF THE DRAWINGS

A specific embodiment of the invention will now be given by way of example only in which.

DETAILED DISCUSSION OF PREFERRED EMBODIMENTS

Figure 1:
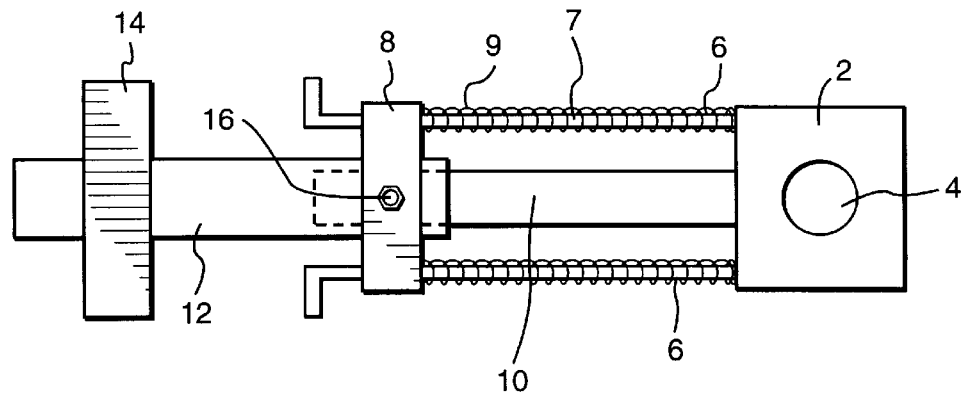
FIG. 1—Shows a plan view of a drill attachment in accordance with the invention.
Figure 2:
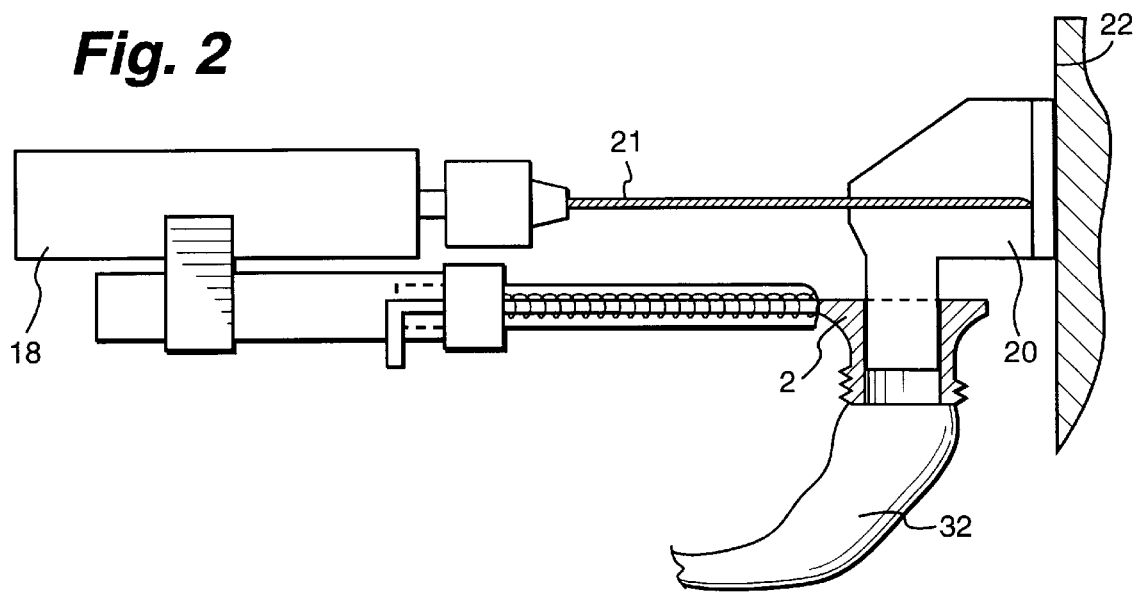
FIG. 2—shows a side view of a drill attachment in accordance with the invention with the drill in situ.

FIG. 1 shows a drill attachment in plan view, with the vacuum nozzle attachment holder 2 having an aperture 4 in which to receive a nozzle 20 (FIG. 2). A pair of depth gauge bars 6 are provided, each comprising a central bar 7 and a spring means 9 and so arranged in connection with the nozzle holder 2 that the spring means acts between the surface of the attachment holder 2 and the locking plate 8. The locking plate 8 having a locking nut means 16, is connected to a rear sliding tube 12 such that when the drill attachment is assembled, the front sliding bar 10, which is connected to the nozzle holder 2, runs inside the rear sliding tube whereby the action of moving the front bar 10 into the rear tube 12 increases the load in the spring means 9.

FIG. 2 shows a side view of the drill attachment shown in 2 mounted on a hand drill 18. The rear drill connection clip 14 secures the rear sliding tube 12 to the body of the hand drill 18 such that in use, as the drill bit 21 is moved towards the work piece 22, the vacuum nozzle 20 meets the work piece first and as the operator continues to move the drill towards the workpiece, the rear sliding tube 12 is forced over the front sliding bar 10 thus compressing the spring means 9 thereby allowing the drill to contact the workpiece 22 and perform its cutting operation. As the operator moves the drill 18 away from the workpiece 22, the front sliding bar 10 and associated nozzle holder 2 will stay in place on the workpiece 22 until the limit of the depth gauge bars 6 is reached, at which point the whole drill and attachment assembly can be lifted clear of the workpiece 22 be re-applied at another position. The vacuum source supply pipe 32 is shown attached to the nozzle holder 2 thereby supplying the vacuum force to the workpiece to remove any generated debris or swarf etc.

Figure 3:
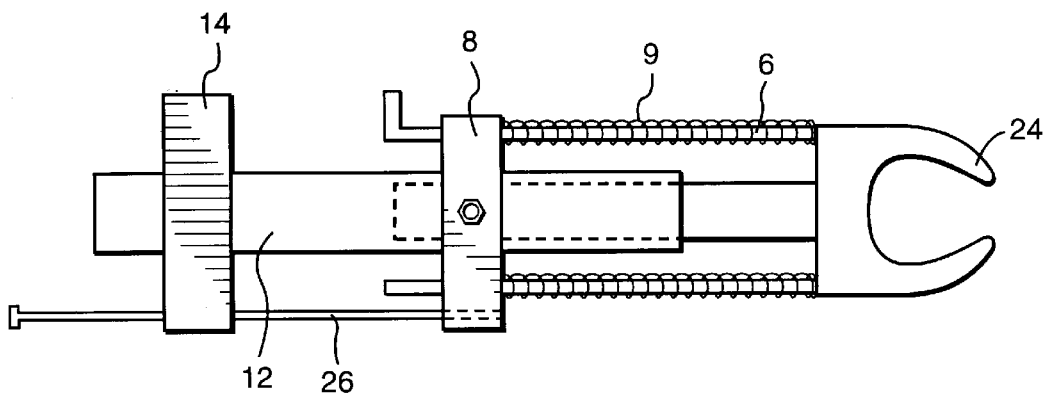
FIG. 3—shows an alternative arrangement of the drill attachment in accordance with the invention.

FIG. 3 shows an alternative arrangement for the drill or machine tool bit attachment comprising a vaccum nozzle attachment holder 24 with an open profile clamp for holding a range of nozzle types 20 and a stabilizing arm means 26 offering increased stability and strength to the assembly.

Various other permutations of components are possible, but the overriding inventive factor linking all such arrangements is the ability to utilize a nozzle attachment in conjunction with a drill or machine tool in an integrated assembly thereby allowing the operator the addition of a swarf removal function without the need to use a separate piece of equipment when drilling or machining in a number of consecutive locations on a workpiece. Having to place a separate vaccum nozzle attachment onto a workpiece is a significant increased burden to an operator and therefore the ability to have a combined drill and swarf removal attachment working as a single unit will significantly improve the usefulness of such debris removal systems and possibly lead to an increase in their use in manufacturing thereby helping to improve the quality of manufacture.

I claim:

1. An attachment for a machine tool, said machine tool having a longitudinal axis and a tool extending therefrom for operation on a workpiece, said attachment for use with a vacuum debris extraction system, said attachment comprising:

a bar;

a vacuum swarf extraction nozzle, having a tool aperture therein, said nozzle secured to said bar;

a tube slidably mounted on the bar and movable along said bar towards and away from said nozzle and secured in use to the machine tool, wherein the bar and tube then lie substantially parallel to the longitudinal axis of the machine tool and so that said tool may extend through the tool aperture in the nozzle;

a locking plate, said locking plate being adjustably mounted along the tube;

at least one spring biasing said nozzle away from said locking plate; and at least one gauge bar, responsive to the position of said locking plate, for limiting the maximum distance between said nozzle and said locking plate, wherein the mounting of said locking plate on said tube limits longitudinal movement of the tube with respect to the bar and thereby controls the depth of operation of the tool on said workpiece.

2. The attachment according to claim 1, wherein said at least one spring and said at least one gauge bar comprises at least one coil spring surrounding said at least one gauge bar.

3. The attachment according to claim 2, wherein said at least one coil spring and gauge bar combination comprises two combinations of coil springs and gauge bars located on opposite sides of said tube.

4. The attachment according to claim 1, wherein said machine tool comprises a drill and the tool extending therefrom comprises a drill bit.

* * * * *